Patented Jan. 13, 1931                                                     1,788,773

UNITED STATES PATENT OFFICE

HOWARD W. MATHESON, OF MONTREAL, QUEBEC, CANADA, ASSIGNOR TO CANADIAN ELECTRO PRODUCTS COMPANY, LIMITED, OF MONTREAL, CANADA

VULCANIZATION ACCELERATOR AND MANUFACTURE THEREOF

No Drawing.          Application filed June 18, 1926.   Serial No. 116,978.

This invention relates to a process of making an acetylene-aniline product useful as an accelerator in the vulcanizing of rubber.

According to the present invention, acetylene and aniline are reacted together in presence of an effective catalyst. The acetylene-aniline product thus obtained, which contains quinaldine and other compounds, is combined as a whole with a suitable aldehyde or is fractioned and suitable fractions combined with an aldehyde.

The acetylene-aniline reaction is obtained by passing acetylene into aniline, preferably anhydrous, in presence of cuprous chloride or other suitable catalyst. The reaction will commence spontaneously but may be expedited by heating; the temperature being preferably maintained between 60° and 120° C. but the reaction will proceed at temperatures above and below this range. A temperature which has been found satisfactory is about 90° C. Under these conditions, approximately one molecule of acetylene is combined for each molecule of aniline present. The reaction may be conducted at atmospheric pressure or higher pressure.

The reaction may now be distilled for removal of uncombined aniline and, if desired, fractioned for separation of various components of the product. The fractions collecting between 200° and 275° C. have been found especially useful.

The fractions collecting between 200° and 240° are secondary bases, such as ethyl aniline and butyl aniline, while the fractions collecting between 240° and 275° are mostly quinaldine or its derivatives.

After removal of the excess aniline, the crude reaction product or selected fractions thereof is caused to react with an aldehyde by bringing the two together. The reaction is spontaneous at the outset but is afterwards preferably heated, until reaction substantially ceases. Any uncombined aldehyde may be distilled off.

In the case of ethyl aniline the reaction with acetaldehyde is believed to be:—

and in the case of quinaldine to be:—

It is possible the fraction between 200° and 240° may be represented by the formula $C_6H_5NH.CH:CH_2$ in which case the acetaldehyde product would be

The material is considerably more active than aldehyde ammonia as an accelerator but not quite as active as hexamethylinetetramine or diphenylguanidine.

The following examples are illustrative of various methods of practising the invention, but it will be understood that the invention is not confined to the details thereof which are explanatory and given without limitative intent.

Example I

One hundred parts of aniline is placed in a suitable vessel with approximately two parts of anhydrous cuprous chloride and heated to approximately 90° C. Acetylene is passed into the liquid and the reaction is heated as may be necessary to maintain an efficient rate of reaction. The acetylene supply is continued until the reaction substantially ceases. The product is distilled for removal of uncombined aniline.

One hundred parts of the acetylene-aniline product obtained as aforesaid (after removal of uncombined aniline) is condensed with twenty parts of acetaldehyde under a reflux condenser. The reaction is spontaneous at the outset and is later heated, for instance on a water bath. When reaction substantially ceases, any uncombined aldehyde may be distilled off.

*Example II*

The reaction is conducted as in Example I, except that fifty parts of acetaldehyde are used.

*Example III*

The acetylene-aniline product obtained as in Example I (after distilling off uncombined aniline), before being condensed with aldehyde, is fractionally distilled and fractions collecting between 200° and 275° C. are treated with acetaldehyde in the manner already explained. Varying proportions of aldehyde may be used.

The proportions of aldehyde combined with the acetylene-aniline product may be varied considerably from those given in the examples, either less or more, and fractions of the product other than specified in Example III may be condensed with varying proportions of aldehyde or may be used without such condensation. The process may also be carried out substantially as described using other aldehydes, such as butaldehyde or heptaldehyde. Furthermore, the condensation with an aldehyde may be effected without first removing uncombined aniline from the crude reaction product.

Having thus described my invention, what I claim is:—

1. A process which comprises condensing with an aldehyde the product obtained by reacting together acetylene and aniline at a temperature between 60° and 120° C. in presence of a catalyst.

2. A process which comprises condensing with acetaldehyde the product obtained by reacting together acetylene and aniline at a temperature between 60° and 120° C. in presence of a catalyst.

3. A process which comprises condensing with an aldehyde the product obtained by reacting together acetylene and aniline at a temperature between 60° and 120° C. in presence of cuprous chloride as catalyst.

4. A process which comprises condensing with acetaldehyde the product obtained by reacting together acetylene and aniline at a temperature between 60° and 120° C. in presence of cuprous chloride as catalyst.

5. A process which comprises condensing with an aldehyde the product obtained by reacting together acetylene and aniline at a temperature between 60° and 120° C. in presence of a catalyst, after distilling off uncombined aniline.

6. A process which comprises condensing with acetaldehyde the product obtained by reacting together acetylene and aniline at a temperature between 60° and 120° C. in presence of a catalyst, after distilling off uncombined aniline.

7. A process which comprises condensing with an aldehyde those fractions which collect between 200° and 275° C. of a product obtained by reacting together acetylene and aniline at a temperature between 60° and 120° C. in presence of a catalyst, after distilling off uncombined aniline.

8. A process which comprises condensing with acetaldehyde those fractions which collect between 200° and 275° C. of a product obtained by reacting together acetylene and aniline at a temperature between 60° and 120° C. in presence of a catalyst, after distilling off uncombined aniline.

9. A composition of matter being the condensation product of an aldehyde and the product of acetylene and aniline reacted at a temperature between 60° and 120° C.

10. A composition of matter being the condensation product of an aldehyde and the product resulting from passing acetylene into aniline at a temperature between 60° and 120° C. in presence of cuprous chloride.

11. A composition of matter being the condensation product of acetaldehyde and the product resulting from passing acetylene into aniline at a temperature between 60° and 120° C. in presence of cuprous chloride.

12. A composition of matter being the condensation product of an aldehyde and the fractions collected between 200° and 275° C. from the distillation of a product resulting from the passage of acetylene into aniline at a temperature between 60° and 120° C. in presence of an effective catalyst.

13. A composition of matter being the condensation product of acetaldehyde and the fractions collected between 200° and 275° C. from the distillation of a product resulting from the passage of acetylene into aniline at a temperature between 60° and 120° C. in presence of an effective catalyst.

In witness whereof, I have hereunto set my hand.

HOWARD W. MATHESON.